A. C. PRATT.
MACHINE FOR MAKING LINK MESH.
APPLICATION FILED APR. 16, 1918.

1,317,726.

Patented Oct. 7, 1919.
6 SHEETS—SHEET 1.

INVENTOR
A. C. Pratt,
BY
ATTORNEYS.

UNITED STATES PATENT OFFICE.

ALPHONSO COMSTOCK PRATT, OF NEW YORK, N. Y., ASSIGNOR TO WHITING & DAVIS COMPANY, A CORPORATION OF NEW YORK.

MACHINE FOR MAKING LINK MESH.

1,317,726.      Specification of Letters Patent.      Patented Oct. 7, 1919.

Application filed April 16, 1918. Serial No. 228,923.

*To all whom it may concern:*

Be it known that I, ALPHONSO COMSTOCK PRATT, a citizen of the United States, residing at the city of New York, in the county of New York, State of New York, have invented certain new and useful Improvements in Machines for Making Link Mesh; and I do hereby declare the following to be a full, clear, and exact description of the invention, such as will enable others skilled in the art to which it appertains to make and use the same.

This invention relates to machines for making link mesh, especially mesh of the type so commonly used in the manufacture of hand bags and purses; more particularly, the invention relates to machines of the type illustrated and described in Letters Patent No. 948,615, granted to me February 8, 1910, preferably one embodying the improvements described in Letters Patent No. 1,028,904, and No. 1,144,724, granted to me June 11, 1912, and June 29, 1915, respectively.

The present invention involves the provision of numerous improvements in the construction and operation of machines of the type illustrated and described in the patents heretofore granted to me whereby the machine is made more reliable and efficient in operation, whereby mesh of a much finer quality can be made on the machine, and whereby the machine is brought to rest automatically in event of failure to make a link and link it with the mesh being made.

One of the features of the invention involves the construction and operation of the various tools employed in making a link and meshing it with the fabric, including the mechanism for feeding the wire forward, for cutting off a length of wire, for bending the wire to form a staple, for advancing the staple to link it with rings of the mesh, and for withdrawing the anvil about which the staple is formed. All of these operating devices are mounted upon a unit support which is preferably arranged at an incline to the surface of the piece of mesh to which the links are being added, the angle being preferably such that a right angle is formed between the link-forming tools and the rings with which the links formed by the tools are meshed.

Another feature of the invention relates to the means employed for positioning the rings after they have been formed so that they will lie in the proper angular relation, thus facilitating the addition of further links. One expedient employed for this purpose is the provision of a cam having an inclined upper wall along which the lower edges of the rings of one row travel as the piece of mesh is moved to present new points thereon for the addition of links. As the mesh is moved and the rings travel up this incline, they are tilted until they finally fall into the positions of proper inclination. This cam is employed in connection with the rings formed by one only of two sets of link-forming tools as the rings formed by the other of the two sets of link-forming tools can be made to fall into their appropriate positions by gravity. Another expedient employed for insuring the proper positioning of the rings as they are formed is the provision of a light air blast directed downwardly upon the rings at the lower edge of a piece of mesh mounted in the machine for the addition of rings at its lower edge. This air blast aids in positioning the rings which are allowed to drop by gravity and also it assists in maintaining the rings which are positively positioned in the relations to which they are moved by the cam so that displacement of rings sufficient to prevent them from receiving the legs of the staples for the new links which are added is of rare occurrence.

Another feature of the present invention involves the provision of a yielding support against which the end of the wire is fed in feeding forward a length of wire for a link. By reason of the provision of this yielding stop, when a piece of wire for a link is cut off from the end of the continuous length of wire, there is little or no danger of the severed piece of wire dropping from the position it occupied prior to being cut off or moving in any way so as to prevent proper coaction of the link-forming devices with the piece of wire.

Another feature of the invention involves the provision of a holding device for holding each ring momentarily after it has been completed and while the link-forming tools are withdrawn from the ring. This holding device consists of a pointed instrument which is projected up into the space about which a ring is formed so that the staple is closed to form a ring about the point of the instrument. When the tools by which the ring is formed are withdrawn, any tendency of the ring to follow one of the tools in its retractile movement is precluded by the engagement of the ring with the holding instrument. The instrument is lowered intermittently while the mesh is stepped around from one position to another but as soon as the mesh comes to rest, the instrument is again raised for coaction with the next ring to be formed.

The invention also involves the provision of an automatic stop device whereby the machine is automatically brought to rest when it fails to insert a link at each of the several points on the mesh presented to the tools for the reception of links. This mechanism is of great delicacy as it is adapted for use in the manufacture of fine mesh from wire of very small diameter. It consists of a support over which each link added to the mesh moves, and a feeler which is reciprocated automatically once for each link of the mesh toward and away from this support. When the feeler on its movement toward the support engages a link, its range of movement is limited and the operation of the mechanism continues without interruption, but in the absence of a link, the range of movement of the feeler is greater and by reason of this increased movement, automatic mechanism is brought into action which brings the machine to rest.

The machine is also provided with numerous devices for effecting adjustment of the range of movement of various parts with great delicacy so that these movements may be made to occur with great accuracy, thereby adapting the machine for use in the manufacture of a fine grade of mesh, such as that made from gold wire of small diameter. All of these improvements will be understood by reference to the following description taken in connection with the accompanying drawings which show the embodiment of the invention which is at present preferred.

In the drawings, Fig. 13 is a central horizontal section of a portion of one of the link-forming tools.

Figures 1, 2, 3:
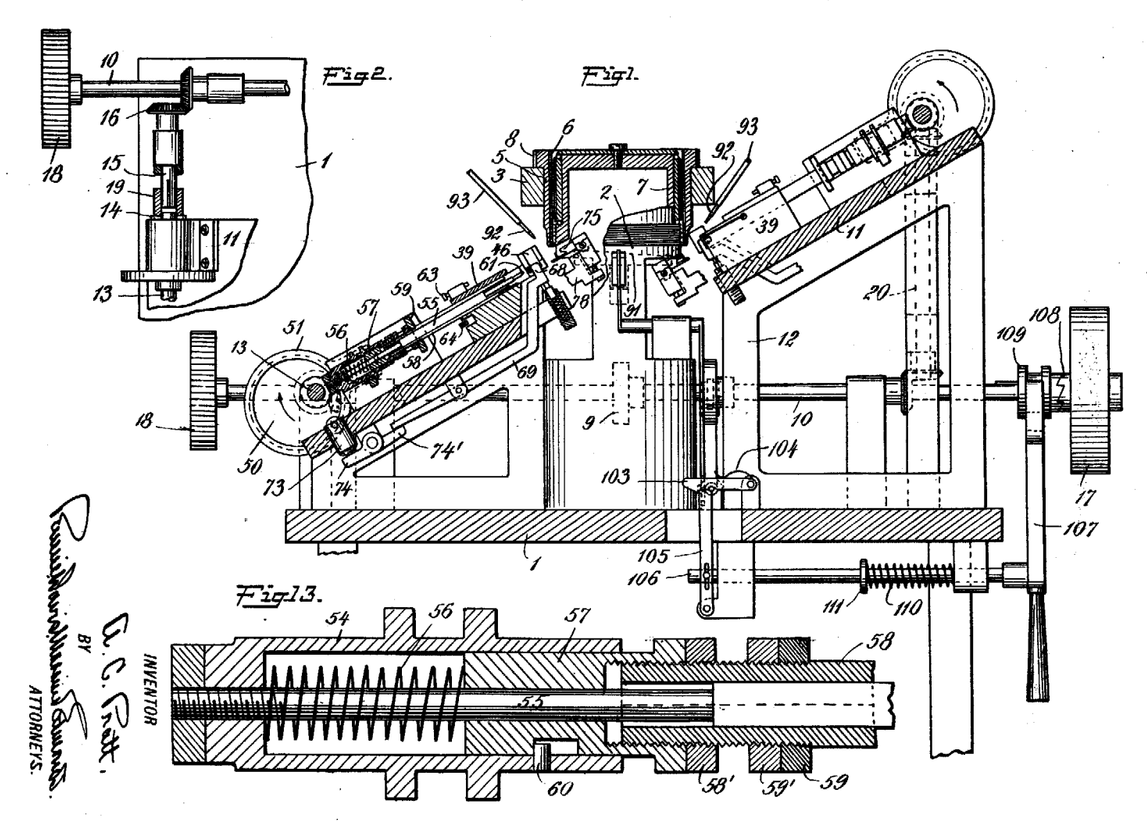
Figure 1 is a sectional elevation of the machine.
Fig. 2 is a detail view of the driving mechanism.
Fig. 3 is a plan view of one of the sets of link-forming devices.
Figures 4, 5:
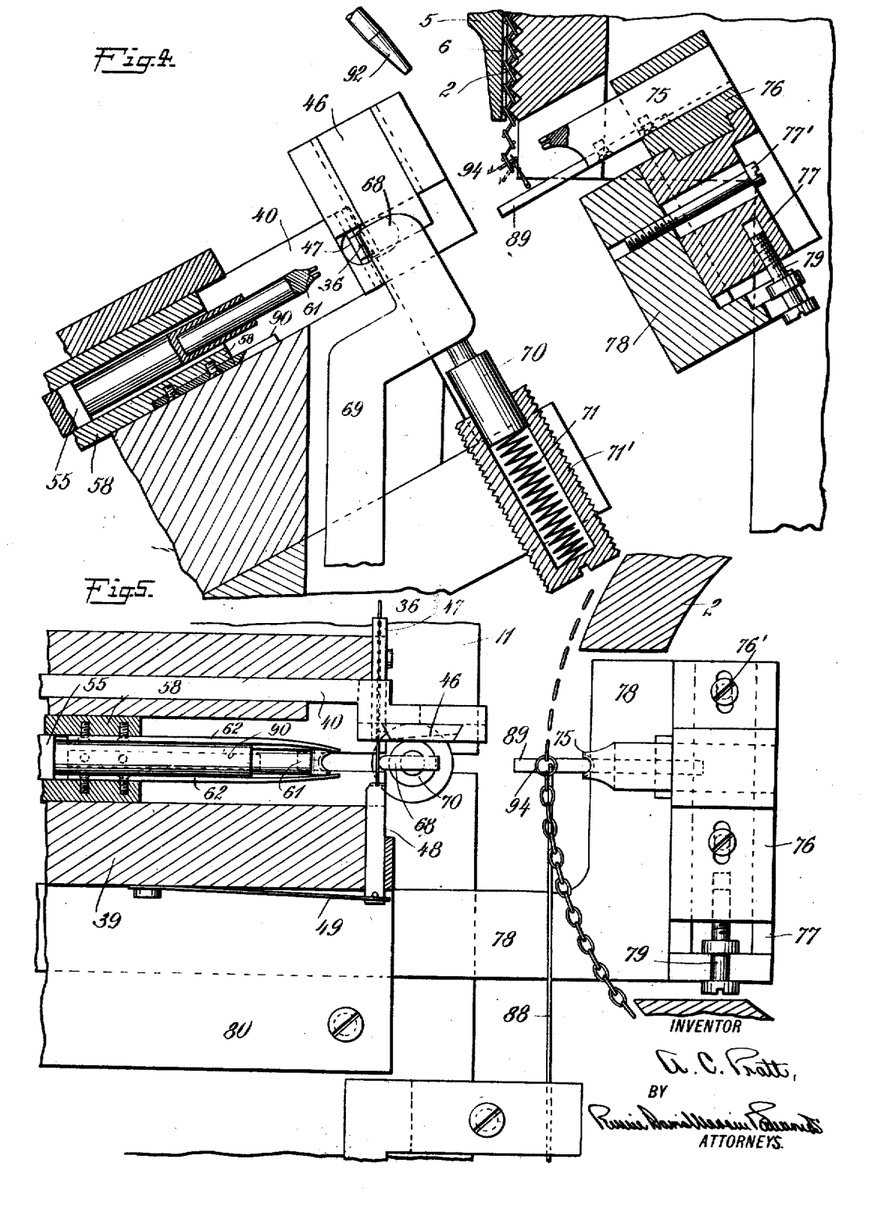
Fig. 4 is a vertical section through one of the pairs of link-forming tools.
Fig. 5 is a horizontal section of the mechanism shown in Fig. 4.

Referring to these drawings, 1 indicates a table on which is mounted a stationary mandrel 2, a portion of which is provided with spirally arranged grooves, as shown in Figs. 1 and 4.

The number of these spiral grooves depends upon the number of pairs of forming-tools employed. In the drawings, the machine illustrated is provided with two sets of forming tools and the mandrel is therefore provided with one spiral groove upon its surface. The size of the groove is governed by the size of the links from which the mesh is to be made. A stationary ring 3 is supported upon the table 1 by means of posts 4 and forms a bearing for a sleeve 5 which fits within the ring. On the interior surface of the sleeve 5 are a plurality of ridges and depressions, as indicated at 6 in Fig. 4, extending in the direction of the axis of the sleeve. The mesh made upon the machine is in the form of a sleeve and it lies in the narrow space between the sleeve 5 and the mandrel 2. The vertical ridges 6 upon the interior surface of the sleeve 5 are adapted to project into the shallow depressions between the lines of rings of the mesh so that when sleeve 5 is rotated, it will cause the sleeve of mesh to rotate with it; and as the spirally arranged ridges on the mandrel 2 project into the corresponding depressions on the inner side of the mesh, when the sleeve of ring mesh is rotated by the sleeve 5, it will follow the spirally arranged grooves and depressions upon the mandrel 2. In other words, as the sleeve of ring mesh is rotated about the stationary mandrel 2, it will be caused to move upward vertically by the threads upon the mandrel. In order to make the rotational movement of the sleeve of mesh about the stationary mandrel more reliable, the mandrel is preferably provided with a sleeve 7 which is rotatable upon ball bearings, as is indicated in Fig. 1. This sleeve lies directly above the spiral grooves upon the mandrel and its exterior surface is provided with vertical ridges and depressions which coact with the depressions and ridges in the mesh. The sleeve 7 turns with the mesh as the latter is turned by the ring 5 and the mesh is moved upwardly between the sleeve 7 and ring 5 by the spiral grooves on the stationary mandrel. The upper end of the sleeve 5 is provided with ratchet teeth, as shown at 8, and these coact with a pawl which is rocked periodically so as to turn the sleeve 5 and the mesh with which it coacts step by step about the axis of the mandrel. The pawl for actuating the ratchet 8 is operated periodically by a cam 9 upon the power shaft 10 of the machine but the pawl and the connections from the cam 9 to the pawl are omitted from the drawings for the sake of clearness; they may be of the construction illustrated and described in Patent No. 948,615, above referred to.

By this mechanism, the sleeve of mesh is moved around about its axis step by step and in each step of rotational movement the mesh moves upwardly slightly. During each period of rest of the mesh, the forming tools are operated to make new links and add them to the mesh. In the present instance, two sets of forming tools are employed, these being located on opposite sides of the mandrel. One set of forming tools is used to make rings which incline in one direction and the other set for making rings which incline in the other direction in the completed piece of mesh on the mandrel. In order to permit of making mesh which is very fine, these forming tools are arranged at an incline to the axis of the mandrel so that the axis of the forming tools of each set is substantially perpendicular to the plane of the rings with which a ring made by the tools is meshed. Each set of forming tools is shown as mounted upon a plate 11 which is secured upon standards 12 mounted on the table 1 and provided with inclined upper faces. Each plate 11 has an operating shaft 13 mounted in bearings thereon and adapted to actuate the several parts of the link-forming mechanism. The shafts 13 of each of the two units are connected to the power shaft 10 in the manner indicated in Fig. 2. In this figure it will be noted that the end of the operating shaft 13 extends beyond the bearing at the edge of the plate 11 and has a pin 14 extending through it. On the table 1 is a short shaft 15 mounted for rotation in a bearing and connected by bevel gears 16 to the power shaft 10 which is provided with a pulley 17 for driving it by power and also with a hand wheel 18 for rotating it by hand. The shaft 15 is provided with a spline lying in a groove in a sleeve 19, the end of which is notched to coact with the pin 14. The operating shaft 13 is therefore driven from the power shaft through the gearing 16, shaft 15, sleeve 19, and clutch consisting of the parts 19 and 14, and it may be readily disconnected from the power shaft at any time by merely moving the sleeve 19 back upon the shaft 15. The unit at the higher level is driven in substantially the same manner, but a vertically disposed shaft is provided, as indicated at 20 in Fig. 1, to carry the power upward from the power shaft 10 to the operating shaft 13.

Figures 3, 6, 7, 8:
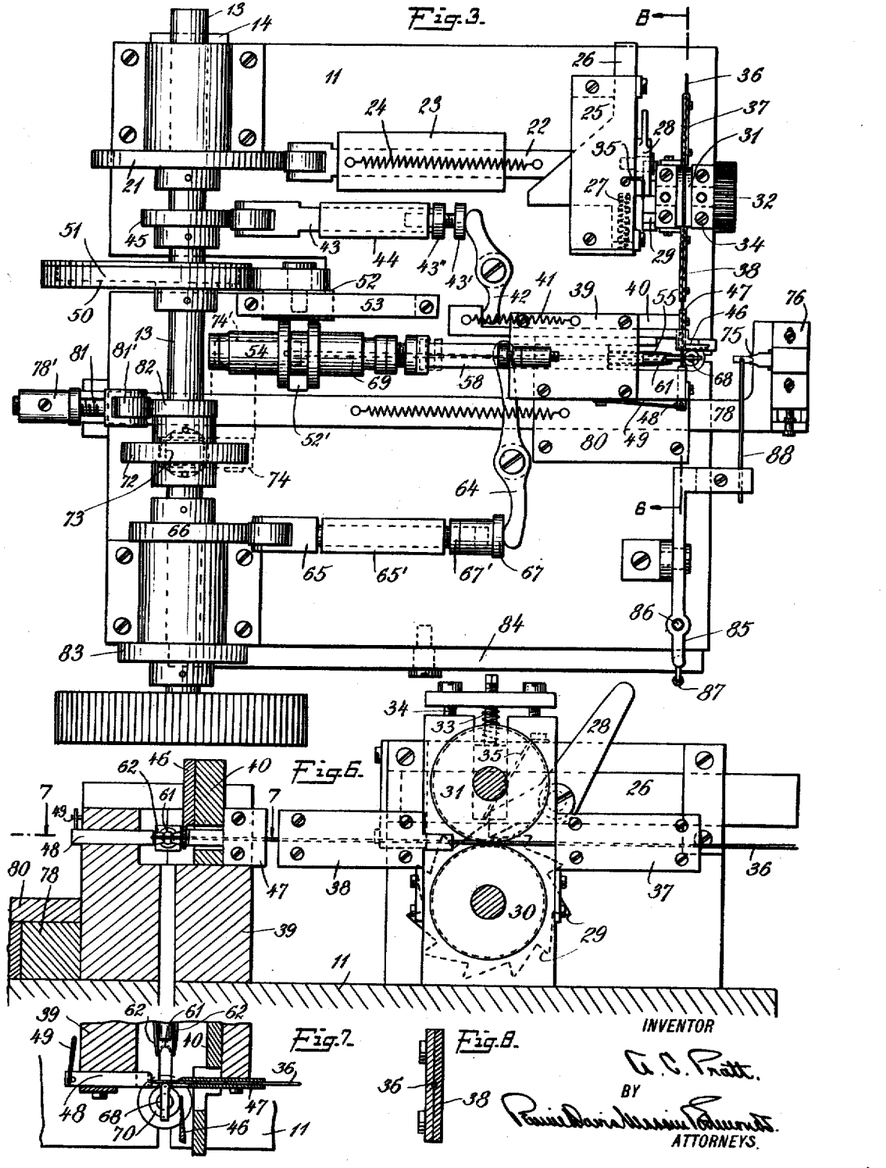
Fig. 6 is a vertical section on line 6—6 of Fig. 3.
Fig. 7 is a sectional detail view on line 7—7 of Fig. 6.
Fig. 8 is a sectional detail view of the guide for the wire.

The construction of the link-forming units is best shown in Fig. 3. The operating shaft 13 is provided with a plurality of cams, each actuating one of the elements of the link-forming mechanism. The first of these cams indicated by the reference 21, effects the feed of the wire. This cam actuates a rod 22 adapted to reciprocate in an opening in a block 23 on the plate 11 and returned by a spring 24, as shown. A block 25 secured upon the table 11 has a guideway formed therein to receive a slide 26 adapted to reciprocate in a direction transverse to the direction of movement of the rod 22. The slide 26 is provided with an inclined wall as shown in Fig. 3, coacting with an inclined wall on the end of the rod 22. It is moved downward in Fig. 3 as the rod 22 is moved to the right by the coaction of these inclined surfaces and it is returned when permitted by rod 22 by a spring 27. The slide 26 has a pawl 28 pivotally mounted thereon, as shown in Fig 6. This pawl is adapted to coact with the teeth on a ratchet wheel 29 secured to the shaft of a feeding roller 30 mounted in bearings secured upon the table 11. This wheel 30 coacts with a similar wheel 31 mounted directly above it and the shafts of the two feed rollers are geared together, as shown at 32 in Fig. 3. The upper feeding roller 31 is pressed downwardly upon the lower one by a spring 33 whose tension may be regulated by screws 34, as indicated in Fig. 6. On the block 25 is a light flat spring 35 which bears upon the end of the pawl 28 so as to hold the pawl always in engagement with the teeth of the ratchet 29.

The peripheries of the rollers 30 and 31 are grooved to coact with the wire 36 which is drawn from a supply wheel mounted in any convenient position. The wire passes through a groove provided in pairs of guide-plates 37 and 38 on opposite sides of the feed rollers. The construction of this guideway is indicated in Fig. 8.

Adjacent to the block 25 in which the slide 26 reciprocates is another block 39 mounted upon the table 11. This block has an opening therethrough in which a slide 40 is adapted to reciprocate. The slide is moved to the right in Fig. 3 by a spring 41 and is moved in the opposite direction against the tension of the spring by a lever 42 pivoted on the table 11 and having one end engaging an enlargement at the end of the slide 40. The other end of this lever 42 engages the end of a slide rod 43 mounted to reciprocate in an opening in a block 44 on the table 11 and actuated by a cam 45 on the operating shaft 13. The end of the slide rod 43 is provided with an adjusting screw 43' and lock nut 43" by which great accuracy in the movement of the slide 40 may be obtained and the danger of the parts working out of their adjusted positions is guarded against.

The inner end of the slide 40 is enlarged upwardly as shown in Fig. 4, and the face of this enlarged portion is provided with a dove-tail groove in which the cutter 46 is received. Figs. 6 and 7 show the blade of the cutter 46 in its relation to the wire and the other parts of the mechanism. The slide 40 upon which the cutter 46 is mounted has a slot cut in it, as shown in Figs. 6 and 7, through which extend plates 47 forming a guide for the wire 36. These plates are similar in construction to those shown in Fig. 8 and they are secured to the end of the block 39. The slot in the slide 40 is of sufficient length to permit the slide to move over the range required for cutting the wire, while the stationary plates 47 project through the slot in the slide up to the point at which the wire is cut.

Opposite the end of the guideway through which the wire is fed is a yielding stop, indicated in the drawings at 48 (Figs. 3, 6 and 7). This may consist merely of a short rod mounted to move slightly in the direction of its length in an opening or guideway formed in the end of the block 39. A light flat spring 49 is secured to the block 39 and presses against a pin on the rod 48. When the wire is fed through the guideway by the feed rollers 30 and 31, its end is carried into engagement with the yielding abutment 48 and it may move that abutment back slightly against the tension of spring 49. When the wire is cut by the knife 46, the spring-pressed rod 48 causes a slight pressure to be exerted upon the end of the length of wire which has been cut off and this pressure is sufficient to eliminate the danger of the wire dropping or even moving slightly after it has been cut off by the knife and before it is gripped by the parts which bend it to the form of a staple.

Next to the cam 45 on the operating shaft 13 is an eccentric 50 and the strap 51 on this eccentric is secured to a cross-head 52 adapted to reciprocate in a guideway formed in a block 53 mounted on the table 11. On the cross-head 52 is a yoke 52' lying between flanges on a cylindrical housing 54, shown in Fig. 3, and on an enlarged scale in Fig. 13. Within this housing is a die-rod 55 secured at its end to the end of the housing 54. A coiled spring 56 encircles the portion of the die-rod 55 within the housing 54; one end of the spring bears upon the end of the housing 54 and the other end bears upon one end of a plunger. This plunger consists of a cylindrical body 57 adapted to move within the end of the opening in the housing 54. At one end the body 57 is interiorly threaded and receives the threaded end of a tubular member 58. This tubular member is made in two parts which lie side by side and when it is adjusted properly with reference to the block 57 it may be locked in its adjusted position by a lock nut 58'. A nut 59 is adjusted upon the exterior threads of the tubular member 58 to serve as a stop, as hereinafter described, and this stop may be held in its adjusted position by a lock nut 59'. In the cylindrical body 57 is a short lengthwise slot, as shown in Fig. 13, into which a pin 60 on the housing 54 projects to insure movement of the plunger with the die-rod under certain conditions.

The opening through the tubular member 58 of the plunger is of square cross-section and the forward portion of the die-rod is similarly shaped. At its extreme end the die-rod has a die 61 formed therein, this die having the form of a semi-circular groove which is horizontally disposed. Each of the two parts of the tubular member 58 has a spring finger 62 secured thereto, these spring fingers normally projecting slightly beyond the die 61 and on opposite sides thereof. The extreme ends of the prongs 62 are grooved to coact with the wire from which a link is formed; the prongs 62 being made of spring metal may yield when necessary by moving away from each other, but they normally press inwardly to the positions in which they are shown in Fig. 5.

The inner ends of the plunger 58 and die-rod 55 are adapted to reciprocate within an opening formed in the block 39 parallel to the opening in which the slide 40 reciprocates. This opening corresponds in shape to the cross-sectional shape of the forward portion of the plunger. On top of the block 39 is an adjustable stop 63 consisting of a screw located in a threaded opening and provided with a lock nut. This stop 63 is in position to be engaged by the stop 59 on the plunger 58. Directly under the plunger, the block 39 is provided with a slot, as shown in Fig. 1, for the reception of the end of a lever 64 adapted to coact with the stop nut 59 on the plunger so as to move the plunger back. This lever 64 is pivoted upon the table 11 and is rocked on its pivot by a slide rod 65 reciprocating in a guideway in a block 65' on the table 11, the slide being actuated by a cam 66 on the operating shaft 13. On the end of the slide 65 is a nut 67 by which suitable adjustment may be made, and this nut is locked in any adjusted position by a lock nut 67'.

The piece of wire fed forward by the feeding devices above described is projected between the die 61 and an anvil 68. This anvil is formed upon the upper end of a lever 69 pivotally mounted upon the under side of the table 11, as shown in Fig. 1. The anvil is normally held in the raised position by a spring-actuated plunger 70 (Fig. 4), its spring 71 being located in a hollow tubular member 71' set into a threaded opening in the table 11, as shown. The anvil is retracted against the pressure of spring 71 by a cam 72 on the operating shaft 13, which cam actuates a plunger 73 set into an opening in the table 11 and coacting with a crank 74 on a short shaft mounted in bearings on the under side of the table 11. This short shaft is provided with a second crank arm 74' which coacts with one end of the pivoted lever 69.

The length of wire projected between the die 61 and the anvil 68 is bent by the die and the prongs 62 about the anvil 68 to form a staple; then the anvil is withdrawn downwardly and the staple is carried forward by the die and the prongs to project the ends of the staple through rings at the lower edge of the piece of mesh upon the mandrel. The ends of the staple are then carried into engagement with an inner die member 75 by which the staple is formed into a ring. The die member 75 is mounted in an opening in a block 76. This block is adjustably secured to another block 77 and the latter is adjustably secured to a supporting arm 78. The block 77 has a groove in its upper face which receives a projection upon the block 76. The block 76 is secured to the block 77 by screws 76' (Fig. 5), which project through slots in the block 76 so that the latter may be secured to block 77 in any position of adjustment. Similarly, the block 77 is provided with slots to receive screws 77' which enter the support 78 so that the block 77 may be secured in any adjusted position upon the support 78. It will be noted that the two adjustments thus provided for are in directions at right angles to each other, permitting of obtaining any desired position of the die 75 with great nicety. Delicacy of movement of the blocks 76 and 77 on their supports may be obtained by reason of the provision of the screws 79 shown in Figs. 4 and 5, and each provided with a lock nut.

The support 78 for the inner die member extends through a guideway in a block 80 mounted on the table 11 and under the operating shaft 13. At its outer end it has a cylindrical member 78' secured to it and interiorly threaded to receive a short threaded shaft 81 carrying a roller 81' which bears upon a cam 82 on the operating shaft 13.

To insure greater accuracy in the movement of the dies and particularly to prevent the dies from moving toward each other more than the desired amount, the two dies have stops rigidly secured to them, which stops come into engagement when the dies have been moved toward each other to the desired positions. These stops are shown best in Fig. 4. The die 75 has a blade 89 secured to the under side thereof and projecting out under the edge of the piece of mesh on the mandrel. The plunger 58 also has a stop blade 90 secured to the under side thereof and projecting forward beyond the end of the plunger in line with the stop 89. When the two dies are moved toward each other, these stops 89 and 90 come into engagement and arrest the movement when the dies have arrived at the proper positions.

Figure 9:
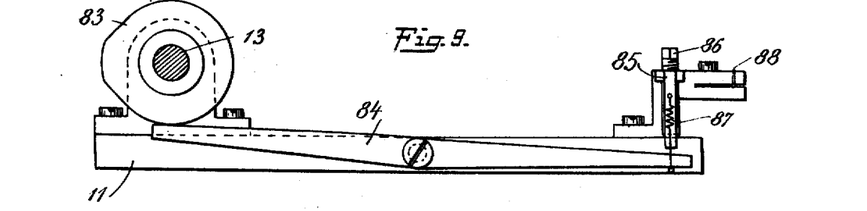
Fig. 9 is a detail view of the mechanism for actuating the device for holding the rings.
Figures 10, 11, 12:
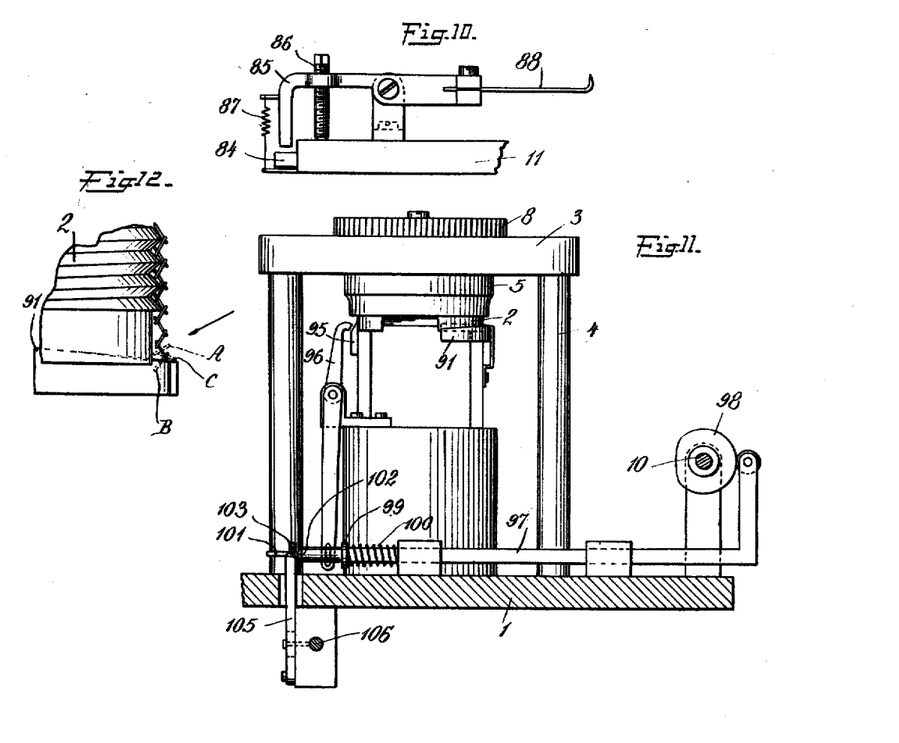
Fig. 10 is a detail view of a portion of the mechanism shown in Fig. 9.
Fig. 11 is an elevation of the mandrel showing the automatic throw-off mechanism.
Fig. 12 is a detail view of a portion of the mandrel and the mesh thereon.

Near the end of the operating shaft 13 is a cam 83 adapted to rock a lever 84 (Fig. 9) pivoted upon the side edge of the plate 11. The inner end of this lever 84 is adapted to engage and operate a lever 85 (Fig. 10) pivotally mounted upon the plate 11 as shown, and provided with a screw stop 86 by which its movement in one direction under the influence of a spring 87 may be regulated as desired. The end of the pivoted lever 85 carries an instrument 88 for holding a ring after it has been formed and while the dies are being withdrawn so that the ring will not follow either one of the dies in the latter's retractile movement. The end of the instrument 88 is turned up as shown in Fig. 10 so that it will project within a ring. The rocking movement of the lever 85 and the instrument 88 carried thereby causes the instrument to be lowered out of coaction with the mesh and held in the lowered position while the mesh is stepped around from one position to the next one, whereupon the instrument is again raised into position for coaction with the next ring to be made.

For the purpose of positioning the rings added to the mesh by the forming tools of one set, a cam 91 (Figs. 1, 11 and 12) is mounted stationarily upon the stationary mandrel. The operative portion of this cam is its upper edge and this upper edge is inclined to the horizontal an amount slightly greater than the pitch of the spiral groove on the stationary mandrel.

The operation of the portions of the machine so far described is as follows: With a sleeve of mesh in the narrow annular space between the ring 5 and the mandrel, the machine is set in operation and the pawl mechanism actuated by the cam 9 causes the sleeve 5 to rotate step by step, carrying the sleeve to mesh with it, and the mesh moves upwardly as it is stepped around rotationally by reason of its coaction with the spiral thread on the mandrel. During the pause at the end of each step movement, the two sets of forming tools are actuated to make a staple, mesh the staple with the mesh on the mandrel, and then form the staple into a ring. The mesh thus made coacts with the spiral thread on the mandrel in the manner indicated in Fig. 12. It will be noted that the links of one row are inclined in one direction and those of the next lower row are inclined in the opposite direction. The inclination of the links of these two rows determines the inclination of the plates 11 of the sets of forming tools. The arrow on Fig. 12 indicates the axis of the forming tools of the upper set and it will be noted that the direction of the arrow is substantially perpendicular to the plane of the rings with which the staple made by the upper set of forming tools will be meshed. The first step in the operation of the forming tools is occasioned by the cam 21, which, through the parts 22, 26 and 28, actuates the feed rollers 30 and 31 to feed a length of the wire 36 across the space between the anvil 68 and die 61. The end of this piece of wire engages the yielding abutment 48 and may move that abutment slightly. Immediately thereafter the cam 45 operates through the parts 43 and 42 to move the slide 40 against the tension of spring 41 and thereby carry the knife 46 into engagement with the wire which has been fed forward. A length of the wire is thus cut off by the knife, but it is held from dropping by the light pressure of the yielding member 48. The eccentric 50 then operates to move the housing 54 and die rod 55 forward. As these parts move forward, the plunger 58 is moved forward with them, it being actuated by the spring 56. The prongs 62 projecting beyond the end of the die 61 engage the length of wire in the grooves at the ends of the prongs and carry the ends of the wire forward around the sides of the anvil 68. When the length of wire has been formed into a staple by shaping it around the anvil 68, the latter is retracted against the pressure of spring 71 by the cam 72. The forward movement of the die rod and plunger actuated by the eccentric 50 continues and the staple is carried forward. In the course of this forward movement, the ends of the staple are projected through two rings of the mesh on the mandrel. During this time the inner die 75 is moved out by the cam 82 operating through the arm 78 on which the inner die is mounted, and the two dies 61 and 75 are brought together so as to shape the staple between them into a ring. Just before the two dies come together, the forward movement of the plunger carrying the prongs 62 is arrested by the engagement of the stop 59 on the plunger with the stationary stop 63 on the block 39. When the forward movement of the plunger is thus arrested, the prongs 62 carried by the plunger pause in their forward movement, but the die 61 continues its forward movement. During this time the plunger does not partake of the forward movement of the housing 54 and the rod 55 secured to the housing, and the spring 56 is slightly compressed and the pin 60 on the housing 54 moves to the right in the slot in the cylindrical member 57 of the plunger until it strikes the right-hand end of the slot and thus checks the independent movement of the die rod and housing. At about this time, the blade 89 on the die 75 comes into contact with the blade 90 on the plunger, with the result that the dies are stopped in the proper relative positions.

While the mesh was being stepped around on the mandrel to present new points thereon to the tools to receive links, the raised part of the cam 83 (Fig. 9) was in contact with the end of the lever 84, and therefore the holding instrument 88 was depressed. Immediately after the step movement of the mesh was completed, the high part of the cam 83 passed the lever 84 and the hooked end of lever 88 was raised by the spring 87. This upward movement of the instrument 88 carried its hooked end upwardly into the space about which a ring should be formed to add that ring to the mesh in the proper relation. Fig. 5 indicates the position of the holding instrument 88. In Fig. 4, the hooked end of the holding instrument is shown in full lines in its retracted position and in dotted lines in its raised position, and it will be noted that in the dotted line position the hook lies within the newly formed link.

After a ring has been formed and meshed with rings of the fabric in this manner, the dies 61 and 75 are retracted to their initial position. It is important that the ring formed by the dies should not follow either one of the dies in this retractile movement. Such movement of the ring is prevented by the holding instrument 88, for if the ring tended to follow the movement of one of the dies, it would be carried into engagement with the hook of the holding instrument and thus detached from the die. Also, it is of importance that the prongs 62 should partake of the retractile movement of the die rod during the initial portion of that movement since otherwise the prongs might engage the ring and displace it. When the die rod begins its retractile movement, the spring 56 is under compression and the pin 60 is at the inner right hand end of the slot in the member 57 shown in Fig. 13. Therefore, the plunger with its prongs 62 might not partake of the first portion of the retractile movement of the die rod if means were not provided to insure its doing so. This is accomplished by the cam-actuated lever 64 whose end engages the stop 59 on the plunger. During the first portion of the retractile movement of the housing 54 and die rod 55, the cam 66 rocks the lever 64 so as to push the plunger with its prongs 62 back in correspondence with the backward movement of the die rod 55. After this movement has progressed far enough to carry the die 61 and prongs 62 clear of the rings which has just been formed, the rocking movement of the lever 64 is discontinued and from that point on the plunger need not partake of the backward movement of the die rod 55 until the relative movement of the die rod and plunger has caused the pin 60 on the plunger 64 to move to the left end of the slot in the member 57. From that point, the coaction of the pin with the end of the slot will cause the die rod and plunger to move back together to their initial positions.

From a consideration of Fig. 12 in connection with Fig. 1, it will be noted that the outer edges of the rings made by the lower set of forming tools should move downwardly after the ring has been completed and the dies are withdrawn. No difficulty is experienced in causing these rings to move to this position. The outer edge of the ring is lower than the inner edge by reason of the inclination of the tools and when the ring is released by the tools, its outer edge always drops so that the ring assumes the position which it should assume in the finished mesh and which it must assume in order that further rings may be added to the mesh in coaction therewith by the machine. As to the rings made by the upper set of forming tools, the situation is different in that the outer edge of each ring is above the inner edge. The ring is in the position indicated by the dotted lines designated A on Fig. 12, when it is released by the dies. Its inner edge should drop when the ring is released so that the ring would assume the position indicated at B. This does not always occur, however, and in fact the construction of the machine may be such that it practically never occurs. Instead, it is the outer edge of the ring which drops and this requires that the ring be moved to its proper position before it is carried around into coaction with the other set of forming tools. This is accomplished by the cam 91 shown in Figs. 1, 11 and 12. When a ring in the position A is released by the forming tools, its outer edge drops and the ring assumes a position approximating that indicated at C. The outer edge of the ring in this position is upon or directly over the upper edge of the cam 91. As the mesh is moved around step by step, the outer edge of this ring travels upon the upper inclined edge of the cam 91 and is raised thereby until finally the outer edge of the ring is raised so far that the ring slides into the position indicated at B, which is the position the ring should occupy in order to assure proper coaction of the next set of forming tools with it.

To further insure proper positioning of the rings at the lower edge of the mesh which is so important to proper functioning of the link-forming tools, provision is made for directing a current of air downwardly upon the rings at the lower edge of the mesh at the points where the rings are formed. In Figs. 1 and 4, a nozzle is shown at 92 supplied with air under light pressure through a tube 93. The nozzle directs air downwardly upon the rings at the lower edge of the mesh at the point at which rings are added to the mesh by the lower set of forming tools. Thus, referring to Fig. 4, the ring shown at 94 is in the position occupied by a ring just after it is released by the dies. The outer edge of this ring 94 should drop so that the ring would assume the position indicated in dotted lines, and this desired movement of the ring is insured by the air blast from the nozzle 92. In addition to this effect upon this ring 94 which is just added to the mesh, the air blast from the nozzle 92 has a beneficial effect with respect to all of the rings at the lower edge of the mesh in that it aids in holding the piece of mesh in proper position with respect to the mandrel and aids in positioning the rings of the lowermost row which are the rings requiring accurate positioning so that the legs of the staples formed by the tools will be passed through them.

A similar nozzle 92 supplied with air under pressure through a tube 93 is provided in connection with the upper set of forming tools. At this point, the air blast serves substantially the same functions as those above referred to, more particularly it aids in holding the outer edges of the rings made by the upper set of forming tools upon the inclined edge of the cam 91, so that the rings will be positioned properly by the cam.

The machine is provided with means for discontinuing its operation whenever there has been a failure to make a link and mesh it with the fabric on the mandrel at the appropriate point. For this purpose the stationary mandrel has a support 95 (Fig. 11) mounted thereon, in such a position that as the mesh is rotated about the mandrel, its lower edge passes over this support. Coacting with this support is a pivoted lever 96 whose end is turned toward the support as shown. This lever is rocked on its pivot, once for each operation of the link-forming tools so as to carry its bent end downwardly toward the support 95 and back. For this purpose the lower end of the lever 96 is provided with a slot which receives a pin on a rod 97 which is adapted to reciprocate in guideways mounted on the table 1 of the machine. The opposite end of the rod 97 is turned upwardly and carries a roller which rides on the periphery of a cam 98 on the power shaft 10 of the machine. The rod 97 is provided with a collar 99 and a spring 100 is coiled on the rod between this collar 99 and one of the blocks in which the rod 97 is supported. The spring therefore tends to hold the roller on the end of rod 97 in coaction with the cam 98 and to move the lever 96 in a direction to carry its bent end toward the support 95. If the rocking movement of the lever 96 were unobstructed, that lever would be moved in one direction by spring 100 and in the opposite direction by cam 98 to carry the bent end of the lever into contact with the support 95 and then away from the support. The lever 96 moves over this range when its movement is unobstructed by a link of the mesh passing over the support 95. When a link of the mesh is in position upon the support 95, the movement of the lever 96 affected by spring 100 is restricted.

The end of the rod 97 is reduced in size as shown at 101 to provide an inclined cam surface 102 joining the two parts of the rod of different cross-section. This cam surface 102 on rod 97 coacts with a pivoted latch 103 (Fig. 1), which is pressed by a spring 104 to hold it normally in latching relation to a lever 105 pivoted on a support depending from the table 1. In the lever 105 is a slot which receives a pin on the end of a rod 106 adapted to move lengthwise thereof in guides fixed to the under side of the table 1. This rod is secured to the operating handle or shipping lever 107 of a clutch. One member 108 of this clutch is formed on the pulley 17 which is loose on the power shaft 10. The other member 109 of the clutch is splined on the power shaft 10 and is provided with a peripheral groove in which the bifurcated end of the shipping lever 107 is received. The rod 106 has a spring 110 coiled upon it and under compression between one of the supports for the rod and a collar 111 which is fixed to the rod.

In the operation of the machine, the lever 96 is reciprocated once for each operation of the forming tools and as it moves toward the support 95 it encounters a ring or two rings at the lower edge of the mesh and its movement is obstructed thereby. This rocking movement of the lever 96 is caused by the longitudinal reciprocation of the rod 97 effected by the cam 98 and spring 100. The effect of limiting the rocking movement of the lever 96 by the presence of a ring of the mesh on the support 95 is to limit the range of reciprocation of the rod 97 to such extent that the cam surface 102 on the rod does not come into contact with the latch 103. In event of a failure of the machine to insert a ring at any one of the appropriate points presented to the forming tools to receive rings, the movement of the mesh would carry the space left vacant by the failure to insert a ring over the support 95, and when this occurs the lever 96 is reciprocated over a greater range carrying its hooked end into contact with the support 95. This greater movement of the lever 96 is accompanied by a greater movement of the rod 97 to the left in Fig. 11 and the cam surface 102 on the rod operates to raise the spring-pressed latch 103 sufficiently to cause its end to release the pivoted lever 105. When this occurs, the spring 110 moves rod 106 and the shipping lever 107 attached to it so as to unship the clutch member 109 from engagement with the clutch member 108 and thus disconnect the driving connection from the pulley 17 to the power shaft 10. The machine is thus brought to rest automatically and practically instantaneously and the failure to supply a ring at the appropriate point may be rectified by forming a ring by hand at the proper point. It is important that the correction of the failure be made at once since otherwise the space in the mesh due to the failure to provide a ring at the proper point would cause a further failure when that point progressed around opposite the next set of forming tools.

Figure 14:
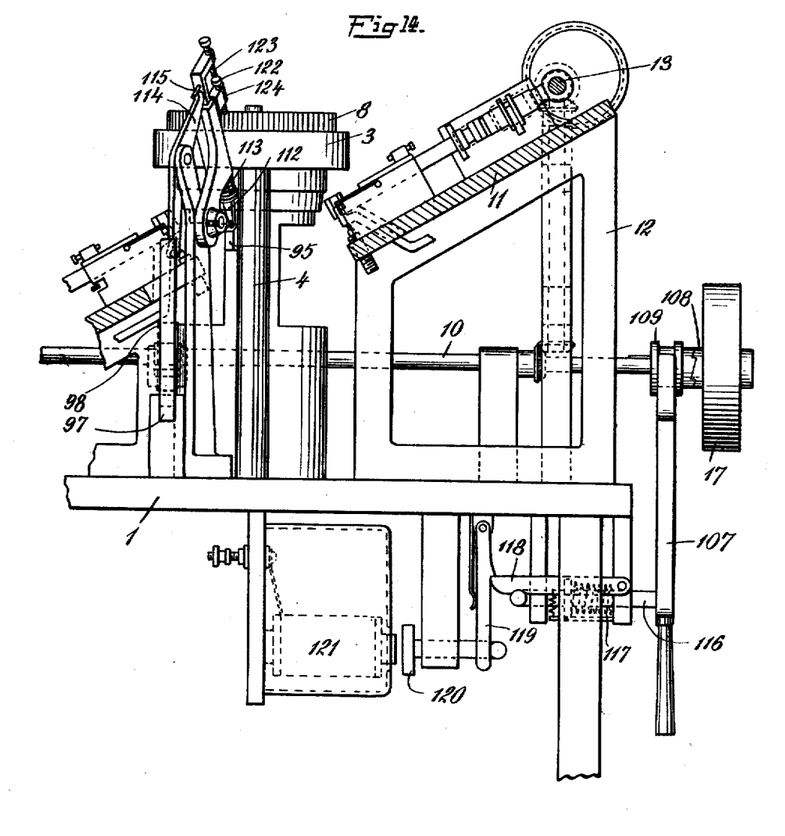
Fig. 14 is a sectional elevation showing an alternative form of throw-off mechanism.
Figure 15:
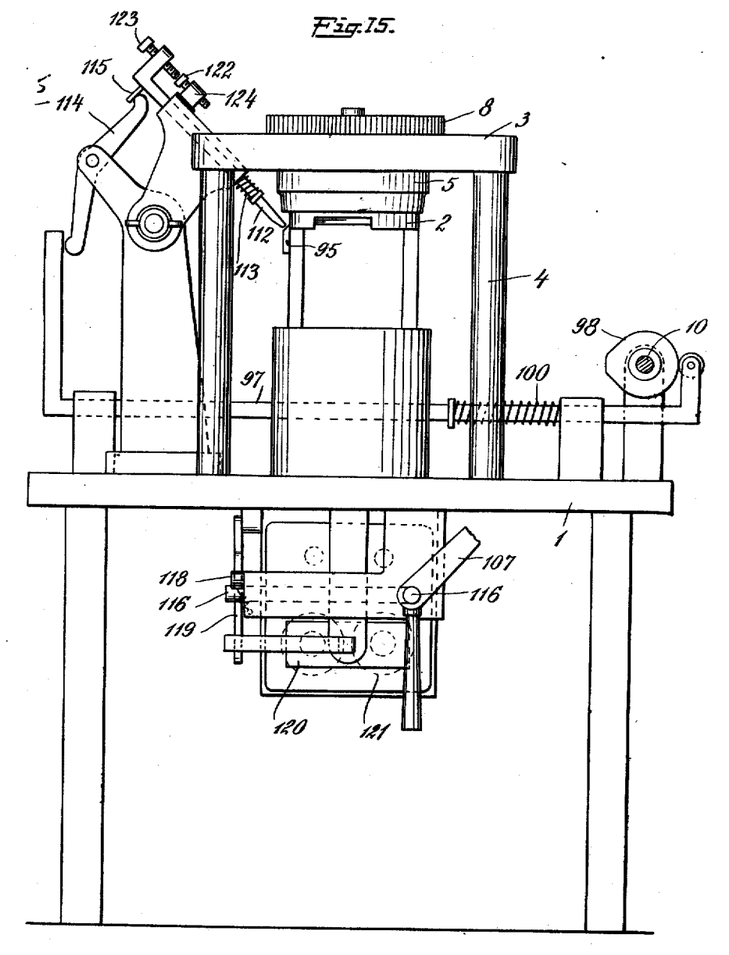
Fig. 15 is an elevation of the mandrel showing the throw-off mechanism of Fig. 14.

In Figs. 14 and 15, a modified form of stop mechanism is illustrated in which electrical devices are employed for disconnecting the power driving devices on failure of the machine to supply a ring at the proper point. In these figures, the support over which the rings at the lower end of the mesh move is shown at 95. Coacting with this is a longitudinally movable rod 112 mounted in a suitable guideway and pressed toward the support 95 by a spring 113. The rod 112 is moved in the opposite direction by a pivoted lever 114, one end of which coacts with the pin 115 on the rod 112. The pivoted lever 114 coacts at one end with the upturned end of the reciprocating rod 97 which is moved in opposite directions by a cam 98 on the power shaft, and a spring 100 coiled about the rod.

The clutch members 108 and 109 and shipping lever or handle 107 shown in Fig. 14 may be similar to the corresponding parts described in connection with Fig. 1. On the shipping lever 107 is a rod 116 provided with a spring 117 for moving the lever and the clutch member 109 to the left. These parts are held against such movement by a pivoted latch 118 provided with a notch in which the bent end of the rod 116 is received. This latch is normally held in the position in which it is shown by a pivoted spring-pressed latch 119 whose position is controlled by the armature 120 of an electromagnet 121. The circuit of the electromagnet 121 is controlled by two contacts 122 and 123, shown in Fig. 15. The contact 122 is a screw supported in a standard 124 which is mounted on the support for the rod 112, but is insulated therefrom. The other contact 123 is a screw which is mounted in an offset on the end of the rod 112. The insulated contact 122 is connected to one terminal of the electro-magnet 121 and the other terminal of the magnet is connected to the frame of the machine and is therefore electrically connected to the contact 123. A battery is included in the circuit of the electro-magnet. During the operation of the machine, the rod 112 is reciprocated once for each operation of the machine, it being moved in one direction by the cam 98 operating through rod 97 and lever 114 and in the other direction by its spring 113. Normally, the movement of the rod 112 toward the support 95 is arrested by the contact of the end of the rod with a link of the mesh which is then in position upon the support 95. When the movement of the rod 112 toward the support 95 is so arrested, the contact 123 is separated from the contact 122. However, in case of a failure of the machine to supply a ring, when the space at which the ring should have been provided comes over the support 95, the movement of the rod 112 toward the support is not arrested and it continues until the contact 123 is carried into engagement with the contact 122. This closes the circuit of the electro-magnet 121 which attracts its armature 120, thereby withdrawing the latch 119 from holding relation to the detent 118. When this occurs, the spring 117 moves rod 116, shipping lever or handle 107, and clutch member 109, to unship the member 109 from clutching relation to the clutch member 108 on the loose pulley 17.

I claim:

1. The combination of a support for a piece of link mesh fabric consisting of a plurality of parallel rows of intermeshing links and a plurality of parallel rows of links substantially transverse to said rows, forming tools for forming links intermeshing with those of the fabric; means for operating the tools, means for effecting a relative movement of the fabric bodily and the tools to present different portions of the fabric to the tools to receive links, and means for directing an air blast upon the links at the edge of the piece of fabric to position them for the reception of new links; substantially as described.

2. The combination of means for supporting a piece of link mesh fabric, a pair of forming tools mounted on opposite sides of the piece of fabric, means for moving the forming tools toward and away from each other to form links and mesh them with the links of the fabric, means for effecting a relative movement between the fabric on the support and the forming tools, and a nozzle through which a blast of air is directed upon the links at the edge of the piece of mesh on the supporting means to assist in positioning those links for the reception of the new links; substantially as described.

3. The combination of a mandrel having a spiral thread formed on the surface thereof, the mandrel being adapted to support a circular piece of link mesh, means for rotating the piece of mesh upon the mandrel and thereby causing it to move in the direction of its axis due to its coaction with the spiral thread, forming tools, means for operating the forming tools to make links and add them to the links at the lower edge of the piece of mesh on the mandrel, and means for directing a blast of air upon the links at the lower edge of the piece of mesh to assist in positioning them; substantially as described.

4. The combination of a stationary cylindrical mandrel adapted to support a circular piece of link mesh and having a spiral thread thereon which coacts with the mesh, means for rotating the piece of mesh upon the mandrel, forming tools, means for operating the tools to form links and mesh them with the links at the lower edge of the piece of mesh on the mandrel, and a stationary cam having an inclined upper wall which is curved in conformity with the curvature of the mandrel and which is located adjacent to the mandrel in position for coaction with the links at the lower edge of the piece of mesh on the mandrel so that as the piece of mesh is moved the links ride upon the inclined wall of the cam and are positioned thereby; substantially as described.

5. The combination of a stationary mandrel for supportting a circular piece of mesh and having a spiral thread thereon, means for rotating the piece of mesh upon the mandrel, two sets of forming tools mounted at different points about the axis of the mandrel, means for operating the tools of the two sets for forming links and meshing them with the links of the lower edge of the piece of fabric on the mandrel, and a cam having an inclined upper wall mounted stationarily upon the mandrel adjacent to one of the sets of forming tools in position to have the links added to the piece of mesh by that set of forming tools ride upon the inclined wall of the cam as the piece of fabric is rotated upon the mandrel to position the links for coaction with the other set of forming tools; substantially as described.

6. The combination of a support for a piece of link mesh fabric, forming tools for forming links meshing with those of the fabric, means for feeding a continuous length of wire to the forming tools, a yielding stop against which the end of the wire is carried by the feeding means, a cutter for severing the end portion of the piece of wire, said stop exerting pressure upon the end portion of the wire after it has been severed to momentarily hold it against movement, means for operating the forming tools, and means for effecting relative movement of the fabric bodily and the tools to present different portions of the fabric to the tools to receive links; substantially as described.

7. The combination of a stationary mandrel for supporting a circular piece of link mesh and having a spiral thread thereon, means for rotating the piece of mesh on the mandrel, a pair of forming tools mounted on opposite sides of the piece of mesh and movable toward and away from each other to form links and mesh them with the fabric on the mandrel, a feeder operated intermittently for feeding a continuous length of wire between the forming tools, a yielding member positioned by a spring and mounted opposite the feeding means so that the end of the wire fed by the feeding means is carried into engagement with the yielding member, and a cutter for severing the end portion of the piece of wire, the yielding member exerting pressure upon the end portion of the wire after it has been severed to momentarily hold it against movement; substantially as described.

8. The combination of a support for a piece of link mesh fabric, a die member mounted on one side of the piece of fabric, a die rod and a plunger mounted on the other side of the piece of fabric in position to coact with the die, means for moving the die rod and plunger forward toward the die together, and separate means for withdrawing the die rod and the plunger; substantially as described.

9. The combination of a support for a piece of link mesh fabric, a die on one side of the fabric, a die rod on the other side of the fabric coöperating therewith, an operating shaft connected to the die and the die rod for reciprocating them toward and away from each other, a plunger associated with the die rod, a spring between the die rod and the plunger through which the forward movement of the die rod is communicated to the plunger, and means independent of the operating means of the die rod for retracting the plunger; substantially as described.

10. In a machine for making link mesh, a link-forming tool including a die rod, a pair of prongs located on opposite sides of the die rod, an operating shaft connected to the die rod for reciprocating it, a spring through which the forward movement of the die rod is communicated to the prongs, and means independent of the movement of the die rod for effecting the first portion of the return movement of the prongs to insure movement thereof with the die rod; substantially as described.

11. In a machine for making link mesh, a link-forming mechanism including a die rod, a movable anvil opposite the end of the die rod, means for feeding wire between the die rod and anvil, a member mounted adjacent to the die rod but movable independently thereof and adapted to coact with the anvil to bend a piece of wire to the form of a staple, means for moving the die rod and said member forward together, and means for insuring backward movement of the die rod and member together; substantially as described.

12. In a machine for making link mesh, a link-forming mechanism including a die rod, a movable anvil opposite the end of the die rod, means for feeding wire between the die rod and anvil, a member mounted adjacent to the die rod but movable independently thereof and adapted to coact with the anvil to bend a piece of wire to the form of a staple, an operating shaft connected to the die rod for reciprocating it, a spring connecting the die rod to said member for moving the member forward as the die rod moves forward, and means independent of the connection from the operating shaft to the die rod for effecting the first portion of the return movement of said member to insure movement thereof with the die rod; substantially as described.

13. The combination of a support for a piece of link mesh fabric and a set of forming tools for forming links and adding them to the piece of fabric on the support, consisting of a plate mounted on side of the piece of fabric, an operating shaft thereon, a pair of die-supporting members, guideways on the plate wherein the die-supporting members are mounted to permit of reciprocating them toward and away from each other, dies carried by said members, cams on the operating shaft for effecting the reciprocatory movement of said members, one of said members extending to the opposite side of the piece of fabric on the support, and securing devices on the last named member permitting adjustment of the die carried by that member in two directions at right angles to each other; substantially as described.

14. The combination of a support for a piece of link mesh fabric, a pair of dies located on opposite sides of the piece of fabric, means for moving the dies toward and away from each other to form links and add the links to the piece of fabric on the support, means for preventing a link from being moved with either of the dies during the retractile movement of the die, and means for effecting relative movement of the fabric bodily and the dies to present different portions of the fabric to the dies to receive links; substantially as described.

15. The combination of a support for a piece of link mesh fabric, a pair of dies for forming links and adding them to the fabric on the support, means for reciprocating the dies toward and away from each other, a holding instrument for preventing a link from being moved by a die during the retractile movement of the die, means for moving the piece of fabric step by step to present different points thereon to the dies to receive links, and a cam for moving the said holding instrument in correspondence with the step by step movement of the fabric to retract the instrument while the fabric is being moved and project it within a newly formed link and hold it at that point while the dies are being retracted; substantially as described.

16. In a machine for making link mesh, a support for the fabric, a pair of forming tools, means for moving the fabric and the forming tools relatively step by step, feeding rollers for feeding a wire to the forming tools, a reciprocating rod for actuating the feeding rollers, a cam for operating the rod, a cutter for the wire, a reciprocating rod for actuating the cutter, a cam for actuating the last named reciprocating rod, and a screw adjustably mounted on the end of the last named rod to increase or decrease its effective length for adjusting the range of movement of the rod produced by its cam; substantially as described.

17. In a machine for making link mesh, a support for the fabric, a pair of forming tools, means for moving the fabric and the tools relatively, means for feeding wire to the forming tools step by step, a knife for cutting the wire, a reciprocating rod carrying the knife and having a slot therein, a stationary guide for the wire extending through the slot, and means separate from the means for moving the forming tools for moving the reciprocating rod relatively to the forming tools; substantially as described.

18. In a machine for making link mesh, the combination of a support for the fabric, a pair of dies mounted on opposite sides of the piece of fabric on the support, means for moving the dies toward and away from each other, and stop devices mounted upon the dies in line with and projecting toward each other and adapted to engage to limit the movement of the dies toward each other; substantially as described.

19. The combination of a stationary mandrel for supporting a circular piece of mesh and having a spiral groove in its surface, means for rotating the piece of mesh about the mandrel, a pair of dies mounted opposite each other at an incline to the axis of the mandrel and one within the cylindrical surface of the mandrel, means for moving the dies toward and away from each other, an anvil in the path of movement of one of the dies and movable out of that path to permit movement of the die, and stops rigidly secured to the two dies and adapted to be brought into engagement by the movement of the two dies toward each other to limit their movement; substantially as described.

20. In a machine for making link mesh, the combination of a support for a piece of link mesh, a pair of forming tools for forming links and adding them to the mesh on the support, means for moving the mesh on the support and the forming tools relatively step by step to present new points on the piece of mesh to the forming tools for the addition of links, a member which is reciprocated in accordance with the step by step movement of the mesh toward and away from the edge of the mesh at which links are being added, a power-driven member, a clutch connecting the power-driven member in driving relation to the machine, a shipping lever for the clutch having a laterally-extending member rigidly secured to it, a spring connected with the laterally-extending member and tending to move the same and the shipping lever in a direction to unship the clutch, a pivoted controller engaging the laterally-extending member, a spring-pressed latch normally engaging the controller, and automatic means under the control of the range of movement of the reciprocating member for positively withdrawing the latch from engagement with the controller when said reciprocating member fails to engage a link of the mesh; substantially as described.

21. In a machine for making link mesh, the combination of a support for a piece of link mesh, a pair of forming tools for forming links and adding them to the mesh on the support, means for moving the mesh on the support and the forming tools relatively step by step to present new points on the piece of mesh to the forming tools for the addition of links, a drive shaft connected to operate the forming tools, a member which is reciprocated in accordance with the step by step movement of the mesh toward and away from the edge of the mesh at which links are being added, a cam on the drive shaft, a slide rod engaged by the cam arranged to positively move the reciprocating member in one of such directions, a spring for effecting the movement of the reciprocating member in the other direction, and means for disconnecting the drive shaft brought into action automatically by the failure of the reciprocating member to engage a link of the mesh; substantially as described.

22. In a machine for making link mesh, the combination of a support for a piece of link mesh, a pair of forming tools for forming links and adding them to the mesh on the support, means for moving the mesh on the support and the forming tools relatively step by step to present new points on the piece of mesh to the forming tools for the addition of links, a drive shaft connected to operate the forming tools, a member which is reciprocated in accordance with the step by step movement of the mesh toward and away from the edge of the mesh at which links are being added, a spring arranged to positively force the reciprocating member toward the mesh, a cam on the drive shaft, a slide rod engaged by the cam for positively forcing the reciprocating member away from the mesh, and automatic stop devices brought into action by the increased range of movement of the reciprocating member effected by its spring when the member fails to engage a link of mesh; substantially as described.

23. The combination of a support for a piece of link mesh, means for moving the piece of link mesh step by step, a pair of forming tools operating during the periods of rest of the step by step movement to form links and add them to the mesh on the support, a member movable in accordance with said step by step movement toward and away from the edge of the piece of mesh at which links are being added, a spring for moving said member toward the mesh, a power shaft, mechanism operated by the power shaft for mechanically moving the member away from the mesh, a contact carried by the member, a contact mounted independently of the member and coacting with said contact, a single electric circuit including said contacts, and electrically operated devices controlled by said circuit for discontinuing the operation of the power shaft automatically when said contacts are carried into engagement by movement of said member actuated by its spring when the member fails to engage a link of the mesh; substantially as described.

24. The combination of a stationary mandrel for supporting a circular piece of link mesh, means for moving the mesh about the mandrel step by step, a pair of forming tools operated during the periods of rest of the step by step movement to form links and mesh them with the fabric on the mandrel at the lower edge thereof, a reciprocating member movable toward and away from the mesh at the lower edge of the piece of fabric on the mandrel in accordance with the step by step movement of the fabric, a spring for positively forcing the reciprocating member toward the mesh, a pair of contacts one of which moves with said member, a power-driven device, means operated thereby for mechanically moving the reciprocating member away from the mesh, a clutch connecting the power-driven device to the machine for operating the latter, a single electric circuit passing through said contacts, and electrical devices controlled by said circuit for operating said clutch to disconnect the power-driven device from the machine when said member, on being actuated by its spring, fails to engage a link of the mesh; substantially as described.

25. The combination of a support for a piece of link mesh fabric, forming tools, means for operating the forming tools, means for feeding a continuous length of wire to the forming tools, a block having a guide passage for the wire and also having an opening alining axially with the guide passage, a spring-pressed stop movable endwise in said opening and against which the end of the wire is carried by the feeding means, a cutter for severing the end portion of the wire, said stop exerting pressure upon the end portion of the wire after it has been severed to momentarily hold it against movement, and means for effecting relative bodily movement between the fabric and the forming tools to present different portions of the fabric to the tools to receive links; substantially as described.

26. The combination of a support for a piece of link mesh fabric, forming tools, operating means for the forming tools, means for feeding a continuous length of wire to the forming tools, a block having a guide passage for the wire and also an opening spaced from but alining axially with the guide passage, one of the forming tools being movable in a passage in the block which communicates with the space between the ends of the opening and the wire guide passage, an anvil projecting into said space for coöperation with the last named forming tool, a spring-pressed stop movable in said opening and against which the end of the wire is carried by the feeding means, and a cutter for severing the end portion of the wire, said stop exerting pressure upon the end portion of the wire after it has been severed to momentarily hold it against movement; substantially as described.

27. In a machine for making link mesh, the combination of a support for the fabric, a pair of coöperating dies mounted on opposite sides of the piece of fabric on the support, means for moving the dies toward and away from each other, and blades rigidly secured to the under-sides of the dies in line with and projecting toward each other and adapted to engage at their confronting ends to limit the movement of the dies toward each other, one die being disposed within the surface of the fabric support and having its blade extending out beneath the edge of the fabric; substantially as described.

28. In a machine for making link mesh, the combination of a support for the fabric, a pair of coöperating forming tools, reciprocating members carrying the forming tools, means for feeding wire to the forming tools step by step, a knife for cutting the wire, a reciprocating member carrying the knife and disposed parallel with the tool-carrying members, the knife-carrying member having a slot therein and being movable relatively to the tool-carrying members, a stationary guide for the wire extending through the slot, and separate operating means for the tool-carrying members and the knife-carrying member; substantially as described.

29. In a machine for making link mesh, the combination of a support for the fabric, a pair of coöperating forming tools, means for feeding wire to the forming tools, a knife for severing the end portion of the wire, a reciprocating member carrying the knife and having a slot therein, a stationary guide for the wire extending through the slot, and a yielding stop against which the wire is carried by the feeding means, said stop being adapted to exert pressure against the end portion of the wire after it has been severed to momentarily hold it against movement, substantially as described.

In testimony whereof I affix my signature.

ALPHONSO COMSTOCK PRATT.

Copies of this patent may be obtained for five cents each, by addressing the "Commissioner of Patents, Washington, D. C."